(12) United States Patent  
Mihara et al.

(10) Patent No.: US 7,795,356 B2  
(45) Date of Patent: Sep. 14, 2010

(54) RUBBER COMPOSITION AND PNEUMATIC TIRE USING THE SAME

(75) Inventors: Satoshi Mihara, Hiratsuka (JP); Yoshihiro Kameda, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 0 days.

(21) Appl. No.: 12/424,134

(22) Filed: Apr. 15, 2009

(65) Prior Publication Data

US 2009/0258989 A1 Oct. 15, 2009

(30) Foreign Application Priority Data

Apr. 15, 2008 (JP) .............. 2008-105970  
Apr. 28, 2008 (JP) .............. 2008-117806

(51) Int. Cl.  
*C08F 8/30* (2006.01)  
*C08F 36/06* (2006.01)

(52) U.S. Cl. .............. 525/331.3; 525/329.3; 525/331.1; 525/332.8; 525/333.1; 525/333.2; 525/374; 524/237; 524/552; 524/566

(58) Field of Classification Search .............. 525/329.3, 525/331.1, 331.3, 332.8, 333.1, 333.2, 374; 524/237, 552, 566  
See application file for complete search history.

(56) References Cited

U.S. PATENT DOCUMENTS

| 3,978,103 | A | 8/1976 | Meyer-Simon et al. |
| 5,227,425 | A | 7/1993 | Rauline |
| 6,270,901 | B1 | 8/2001 | Parsonage et al. |
| 7,271,208 | B2 * | 9/2007 | Lin et al. .............. 524/237 |

FOREIGN PATENT DOCUMENTS

| JP | 08-283454 A | 10/1996 |
| JP | 09-111052 A | 4/1997 |
| JP | 10-053667 A | 2/1998 |
| JP | 10-120852 A | 5/1998 |
| JP | 2001-318513 A | 11/2001 |
| JP | 2001-526972 | 12/2001 |
| JP | 2002-060550 A | 2/2002 |
| JP | 2005112921 A | 4/2005 |
| JP | 2005-350644 A | 12/2005 |
| JP | 2006-509851 | 3/2006 |
| JP | 2007-261079 A | 10/2007 |
| WO | WO-2004/052983 A1 | 6/2004 |
| WO | WO-2008102513 A1 | 8/2008 |

* cited by examiner

Primary Examiner—Ling-Siu Choi  
(74) Attorney, Agent, or Firm—Connolly Bove Lodge & Hutz LLP

(57) ABSTRACT

A rubber composition containing 100 parts by weight of a diene-based rubber, 20 to 120 parts by weight of silica, 3 to 15% by weight, based upon the weight of silica, of a sulfur-containing silane coupling agent and (A) 1,5-diazabicyclo[4,3,0]nonene-5 (DBN) having the formula (I):

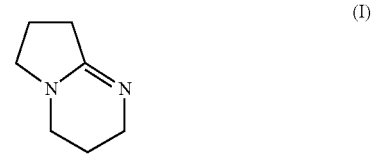

(I)

and/or a salt thereof or (B) 0.1 to 3.0 parts by weight of a compound having a piperidine skeleton having the formula (II) or a salt thereof and/or formula (III):

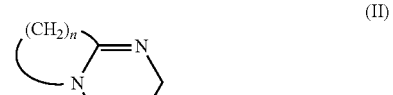

(II)

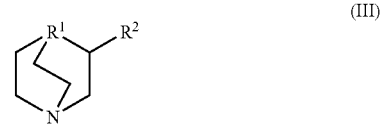

(III)

wherein n indicates 3 or 5, $R^1$ indicates CH or N and $R^2$ indicates H or OH when $R^1$ is CH, or H when $R^1$ is N, and a melamine derivative of formula (IV):

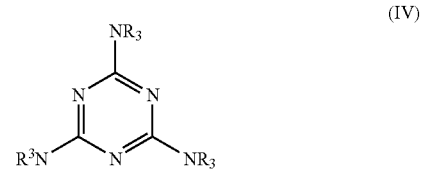

(IV)

wherein $R^3$ is a methoxymethyl group ($—CH_2OCH_3$) or methylol group ($—CH_2OH$), the number of methoxymethyl groups is 3 to 6, and the number of methylol groups is 0 to 3, and/or polymer or copolymer resins of the same and a pneumatic tire using the same.

6 Claims, No Drawings

RUBBER COMPOSITION AND PNEUMATIC TIRE USING THE SAME

TECHNICAL FIELD

The present invention relates to a rubber composition and a pneumatic tire using the same, more specifically relates to a rubber composition using a specific compound having a piperidine skeleton to improve the dispersability of silica and the vulcanization speed, reinforcability and viscoelastic properties of a rubber composition, without compounding diphenyl guanidine (DPG) or with decreasing the compounding amount of DPG and using the compound having a piperidine skeleton to, for example, suppress migration thereof to adjacent a part of a tire whereby the problem of the decrease in the adhesion of rubber/metal and a pneumatic tire using the same.

BACKGROUND ART

Along with the improved performance and improved functions of automobiles, the performance demanded from tires has become higher year and year. As a part thereof, while maintaining the grip on wet road surfaces, that is, the wet grip, development of tires contributing to lower fuel consumption is being strongly demanded. The reinforcing filler, which had been used for tire treads in the past, was carbon black, but recently, due to the above demand, silica, which has excellent low hysteresis loss and wet skid property compared with carbon black, has begun to be used as a reinforcing filler for tire treads (e.g., see U.S. Pat. No. 5,227,425). However, a silica-based filler has hydrophilic silanol groups on the surface thereof and, therefore, is inferior to carbon black in the affinity thereof to rubber molecules. For this reason, while a silica-based filler is superior in the low hysteresis loss and wet skid property, there was the problem that the reinforcibility thereof and the abrasion resistance thereof did not reach those of carbon black. Therefore, to make the reinforcibility of silica-based fillers the same extent as carbon black, a silane coupling agent chemically bonding the rubber molecules with the surfaces of the silica particles so as to be able to increase the reinforcibility has been jointly used (for example, see U.S. Pat. No. 3,978,103). As a typical silane coupling agent, bis(3-triethoxysilylpropyl) tetrasulfide may be mentioned.

However, when mixing a silane coupling agent into a silica-containing rubber composition, there were the problems that if the coupling reaction between the silica and the silane coupling agent was insufficient, excellent dispersability of the silica could not be obtained while if the coupling reaction was excessive, rubber scorching was invited and the quality fell. For this reason, with the conventional kneading method, during the kneading work, a thermocouple etc. was used to measure the rubber temperature at all times and the kneading operation was performed within an empirically set time while maintaining the rubber temperature in a constant range, but there was the problem that the amount of reaction of the silica and silane coupling agent was not necessarily constant with each batch and balancing the mixability of the silica formulation and the desired rubber properties was extremely difficult.

In this regard, for silica-containing rubber compositions, in the past, diphenyl guanidine (DPG) has been made much use of as a vulcanization accelerator. However, in recent years, the detrimental effect on rubber/steel cord bonding have been feared and there has been a movement toward reducing the amount of DPG used. However, in large silica-content rubber compositions, there was the problem that if the amount of use of DPG was slashed, the vulcanization speed dropped and the dispersion of the silica in the rubber deteriorated.

Japanese Patent Publication (A) No. 2005-112921 discloses the compounding, into a diene-based rubber, of a secondary amine compound having a piperidine skeleton, i.e., 2,2,6,6-tetramethyl piperidine or derivatives thereof so as to be able to obtain a rubber composition having a high grip performance, but this publication does not describe the compounding of said compound, together with silica, and therefore, there is no description therein relating to the dispersibility or workability of silica.

Japanese Patent Publication No. 2006-509851 A describes the compounding, into a diene elastomer polymer, of an organic quaternary ammonium salt together with silica or another additive so as to obtain a vulcanized product exhibiting excellent mechanical properties, while maintaining an allowable vulcanization speed even when a secondary vulcanization accelerator is not added. This publication describes the use of 1,4-diazabicyclo[2,2,2]octane for preparation of an organic quaternary ammonium salt (see Examples 1 and 2), but does not describe, at all, the compounding of 1,5-diazabicyclo[4,3,0]nonene-5 (DBN) into a rubber composition.

In this regard, as explained above, had reduction of the amount of use of DPG, which is feared to have a detrimental effect on rubber/metal bonding, as one of their main tasks, but in compounds of formulations containing large amounts of silica, slashing the DPG results in a drop in the vulcanization speed and a deterioration in the dispersion of the silica. In consideration of these problems, the present inventor found, as disclosed in the Japanese Patent Application No. 2007-041005 (i.e., International Publication No. WO 2008/102513), that by compounding a compound having a piperidine skeleton, i.e., Quinuclidine or Quinuclidinol, in a compound of a formulation containing a large amount of silica, it is possible to improve the vulcanization speed and silica dispersion, reinforcibility and viscoelastic properties and the decrease in the compounding amount of DPG. However, since the molecular weights of these compounds are small, the speed of migration to adjacent parts of a pneumatic tire is fast and the detrimental effect on the rubber/metal bondability was insufficiently suppressed.

DISCLOSURE OF THE INVENTION

Accordingly, the objects of the present invention are to solve the problem of the decrease in the vulcanization speed or the deterioration of dispersion of the silica in the rubber composition, without decreasing the amount of use of DPG in the rubber composition or using DPG by using a specific compound having a piperidine skeleton and to provide a rubber composition suppressing the migration of these compounds to adjacent parts and suppressing the decrease in the rubber/metal bondability.

In accordance with the present invention, there is provided a rubber composition comprising 100 parts by weight of a diene-based rubber, 20 to 120 parts by weight of silica, 3 to 15% by weight based upon the weight of the silica, of a sulfur-containing silane coupling agent and 1,5-diazabicyclo[4,3,0]nonene-5 (DBN) having the formula (I):

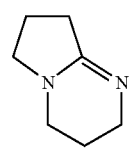

and/or a salt thereof.

In accordance with the present invention, there is further provided a pneumatic tire using the rubber composition as a pneumatic tire, in particular, a cap tread thereof.

In accordance with the present invention, there is further provided a rubber composition comprising 100 parts by weight of a diene-based rubber, 20 to 120 parts by weight of silica, 3 to 15% by weight of the silica of a sulfur-containing silane coupling agent, 0.1 to 3.0 part by weight of a compound having a piperidine skeleton having the formula (II), or a salt thereof, and/or the formula (III):

(II)

wherein n indicates 3 or 5

(III)

wherein $R^1$ indicates CH or N and $R^2$ indicates H or OH when $R^1$ is CH, or H when $R^1$ is N and a melamine derivative having the formula (IV):

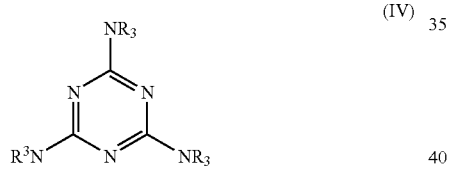

(IV)

wherein $R^3$ indicates a methoxymethyl group (—$CH_2OCH_3$) or methylol group (—$CH_2OH$), the number of methoxymethyl groups is 3 to 6, and the number of methylol groups is 0 to 3, and/or polymer or copolymer resins thereof.

In accordance with the present invention, there is still further provided a pneumatic tire using the rubber composition for the pneumatic tire, in particular as the tread thereof.

According to the present invention, by compounding, into a silica-containing rubber composition, the 1,5-diazabicyclo[4.3.0]nonene-5 (DBN) having the formula (I) having a piperidine skeleton and/or salts thereof, it becomes possible to improve the vulcanization speed of the rubber composition or silica dispersion, reinforcibility and viscoelastic properties and to decrease the amount of the DPG.

According to the present invention, further, by compounding, into a silica-containing rubber composition, the compound having a piperidine skeleton having the formula (II) or its salts or the formula (III) having a bicyclo structure, it becomes possible to improve vulcanization speed or silica dispersion, reinforcibility and viscoelastic properties of the rubber composition and to decrease the amount of the DPG. Further, by compounding a melamine derivative having the formula (IV) or a polymer or copolymer resin thereof, it is possible to suppress the migration of the compound having a piperidine skeleton to adjacent parts and to suppress the decrease in the rubber/metal bondability.

BEST MODE FOR CARRYING OUT THE INVENTION

The present inventors engaged in research to solve the above problems and, as a result, found that by compounding, into a silica-containing rubber composition containing a diene-based rubber, the DBN of having the formula (I) and/or the salts thereof, it the is possible to improve the vulcanization speed or silica dispersion, reinforcibility and further viscoelastic properties of the rubber composition and possible to replace a part or all of the DPG, that by compounding thereinto the compound having a bicyclo structure of formula (II) (or its salts, the same below) or (III), it is possible to improve the vulcanization speed or silica dispersion, reinforcibility or viscoelastic properties of the rubber composition and possible to replace a part or all of the DPG, and that by compounding thereinto a melamine derivative having the formula (IV) or the polymer or copolymer resin thereof, it is possible to suppress the migration of the compound having a piperidine skeleton to adjacent parts and to suppress the decrease in rubber/metal bondability.

The compound having the formula (II) is a 1,5-diazabicyclo[4,3,0]nonene-5 (DBN) or salts thereof or 1,8-diazabicyclo[5,4,0]undecene-7 (DBU) or salts thereof, having by the following structure:

1,5-diazabicyclo[4,3,0] nonene-5    1,8-diazabicyclo[5,4,0]undecene-7 while the compound having the formula (III) is Quinuclidine (i.e., 1-azabicyclo[2,2,2]), Quinuclidinol (i.e., 1-azabicyclo[2,2,2]-3-ol), or DABCO (i.e., 1,4-diazabicyclo[2,2,2]octane) having the following structure:

Quinuclidine    Quinuclidinol    DABCO

According to the present invention, 20 to 120 parts by weight, preferably 40 to 80 parts by weight, of silica, 3 to 15% by weight, based upon the weight of silica, preferably 5 to 10% by weight, of a sulfur-containing silane coupling agent and 100 parts by weight of DBN having the chemical formula (I) and/or salts thereof are compounded into a diene-based rubber.

According to the present invention, further, by mixing, into the compound having the formula (II) and/or (III), it is possible to improve the vulcanization speed or silica dispersion of the rubber composition, reinforcibility and viscoelastic properties and replace a part or all of the DPG and by compounding the melamine derivative having the formula (IV) or a polymer or copolymer resin thereof, it is possible to suppress the migration of the compound having a piperidine skeleton to adjacent parts and to suppress the decrease in the rubber/metal bondability.

As the diene-based rubber usable in the rubber composition of the present invention, a natural rubber (NR), polyisoprene rubber (IR), polybutadiene rubber (BR), styrene-butadiene copolymer rubber (SBR), acrylonitrile butadiene rubber, ethylene-propylene-diene copolymer rubber, styrene-isoprene copolymer rubber, isoprene-butadiene copolymer rubber, etc. may be mentioned. These may be used alone or in any mixtures thereof.

As the silica usable in the rubber composition of the present invention, it is possible to use any silica mixed into rubber compositions for tires and other uses in the past. If the compounding amount of the silica is small, not only are the strength and abrasion resistance insufficient, but also both the wet frictional force and low heat buildup cannot be sufficiently achieved by the inclusion of silica, and therefore, this is not preferable. Conversely if too large, the mixability decreases and the heat buildup increases, and therefore, this is not preferred.

As the sulfur-containing silane coupling agent usable in the rubber composition of the present invention, it is possible to use any coupling agent among those conventionally mixed with silica, preferably those containing a sulfur atom in the molecule thereof. For example 3-trimethoxy-silylpropyl-N, N-dimethylcarbamoyl tetrasulfide, trimethoxysilylpropyl-mercaptobenzothiazole tetrasulfide, triethoxysilylpropyl-methacrylate monosulfide, dimethoxymethylsilylpropyl-N, N-dimethylthiocarbamoyl tetrasulfide, bis-[3-(triethoxysilyl)-propyl]tetrasulfide, bis-[3-(triethoxysilyl)propyl]disulfide, 3-mercaptopropyltrimethoxysilane, etc. may be used. These are known compounds. Numerous commercially available products may be utilized. If the compounding amount of the silane coupling agent is small, the insufficient reinforcibility of the silica is liable to cause the decrease in the rubber strength or abrasion resistance, and therefore, this is not preferred. Conversely, if large, scorching is liable to occur during the processing, and therefore, this is not preferred.

The amount of the DBN having the formula (I) and/or the salts thereof, when used alone or in total when used jointly with DIG, is preferably 0.1 to 10 parts by weight, more preferably 0.5 to 3 parts by weight, based upon 100 parts by weight of the rubber. The DBN of the formula (I) and/or the salts thereof is preferably added into the rubber composition and kneaded and mixed at the stage of the silanization reaction (i.e., the reaction of the silica with the silane coupling agent) at the same time as the silica and the silane coupling agent. As DBN salts, for example octylate, DBN-phenol novolac resin salt, etc. may be mentioned.

The DBN having the formula (I) or the salts thereof are known compounds. Commercially available products of these compounds may be used, and therefore, they do not have to be specially synthesized. For example, from San-Apro, DBN or U-CAT1102 (DBN octylate), U-CAT881 (DBN phenol novolac resin salt), etc. are commercially available.

The DBN used in the present invention has a pKa of about 12.9. These compounds accelerate the silanization reaction due to their high nucleophilic property and enable a reduction of the Payne effect. Further, even if these compounds are used instead of DPG, there is no adverse effect on the vulcanization speed. This point is also one of the major merits of the present invention.

The compounding amount of the compound having the piperidine skeleton expressed by said formula (II) and/or (III), alone or in total when jointly used with DPG, is 0.1 to 10 parts by weight, preferably 0.5 to 3.0 parts by weight, based upon 100 parts by weight of the rubber. The tertiary amine compound having these formula (II) and/or (III) is preferably added into and kneaded with mixed with the rubber composition at the stage of the silanization reaction (i.e., the reaction between the silica and the silane coupling agent) at the same time with the silica and the silane coupling agent.

As the compound having the formula (II) usable in the rubber composition of the present invention, preferably at least one type of compound having a bicyclo structure selected from the group consisting of 1,5-diazabicyclo[4,3,0]nonene-5 (DBN) having the formula (II) or the salts thereof and 1,8-diazabicyclo[5,4,0]undecene-7 (DBU) or the salts thereof may be used. The DBN having the formula (II) or the salts thereof are known compounds. As salts of DBN, for example, DBN octylate, DBN phenol novolac resin salt, etc. may be mentioned. Commercially available products thereof may be used, and therefore, they do not have to be specially synthesized. For example, from San-Apro, DBN or U-CAT1102 (DBN octylate), U-CAT881 (DBN phenol novolac resin salt), etc. are commercially available. On the other hand, the DBU or the salts thereof are also known compounds. As salts of DBU, for example. DBU octylate, DBU oleate, DBU p-toluenesulfonate, DBU formate, etc. may be mentioned. Commercially available products of these compounds may be used. For example, from San-Apro, DBU or U-CAT SA102-50 (DBU octylate), U-CAT SA112 (DBU octylate), U-CAT SA106 (DBU oleate), U-CAT SA506 (DBU p-toluenesulfonate), U-CAT SA603 (DBU formate), etc. are commercially available.

As the compound having the formula (III) usable for the rubber composition of the present invention, preferably at least one type of compounds having a bicyclo structure selected from the 1-azabicyclo[2,2,2] of the formula (II) (i.e., Quinuclidine); (ii) 1-azabicyclo[2,2,2]-3-ol (i.e., 3-Quinuclidinol) of the formula, and (iii) 1,4-diazabicyclo[2,2,2]octane (i.e., DABCO) of the formula may be used.

Quinuclidine and Quinuclidinol having the formula (III) are both commercially available products and do not have to be specially synthesized. For example, they can be obtained as reagents from Aldrich. Further, the DABCO of formula (III) is also a commercially available product and can, for example, be obtained from Aldrich as DABCO.

The compounds of formula (III) preferably used in the present invention, as explained above, are Quinuclidine (pKa=11.5), 3-Quinuclidinol (pKa=10.1), and DABCO (pKa=8.8). These compounds can accelerate the silanization reaction and decrease the Payne effect by their high nucleophilic property. Further, even if these compounds are used, instead of DPG, there is no adverse effect on the vulcanization speed. This point is also one of the major merits of the present invention.

DPG has the following advantages in the silica-containing rubber composition, and therefore, has been generally used in the past.

(1) By the use thereof, as a secondary vulcanization accelerator, it is possible to suppress the decrease in the vulcanization speed due to the degree of acidity of silica.

(2) By the interaction thereof with the silica surface, it is possible to prevent agglomeration of silica particles and reduce the Payne effect (i.e., the increase in the storage modulus due to the interaction between silica) and possible to raise the reinforcibility by acceleration of silanization.

However, as explained above, in recent years, the detrimental effect of DPG on rubber/steel cord bonding has become a concern. Decrease of the amount of use of DPG or search of alternatives has become a hot topic.

The present inventors took note of the large pKa value of compounds having the formula (II) and (III) as alternatives to DPG. In the silanization reaction (i.e., reaction of the silica-silane coupling agent), the hydrolysis speed of the silane coupling agent has become important. These compounds are said to accelerate the hydrolysis by a bimolecular nucleophilic substitution reaction (SN2). In particular, these compounds bond with the alkyl chain at all nitrogen atoms. Alkyl groups are high in electron donor ability and remarkably improve the nucleophilic property of the nitrogen atoms. As a result, the silanization is promoted. Further, in general, the acidity (pH) of the silica surface is 6 to 7 or so. To accelerate the silanization reaction, it is important to make the pKa value larger than the pH of silica surface.

Therefore, as explained above, the compound having the formula (II) and/or (III) has a relatively small molecular weight, and therefore, for example, the present inventors found that the problem of migration to the adjacent parts and, for example, causing a decrease in the rubber/metal bondability is liable to arise, when using a rubber composition for a pneumatic tire. Therefore, according to the present invention, the present inventors found that by mixing said melamine derivative of formula (IV) and/or polymer or copolymer resins of the same, it is possible to suppress migration of the compound (II) and/or (III) to adjacent parts and effectively solve the problem of the decrease in the rubber/metal bondability.

The melamine derivative of formula (IV) and polymer or copolymer resins of the same are known substances and are widely commercially available. As the substance, for example, monomethylol melamine, dimethylol melamine, trimethylol melamine, tetramethylol melamine, pentamethylol melamine, hexamethylol melamine, polyhydric methylol melamine resin etc. may be mentioned.

The compounding amount of the melamine derivative having the formula (IV) and the polymer or copolymer resins thereof is not particularly limited, but is preferably 0.2 to 10 parts by weight, based upon 100 parts by weight of the diene-based rubber, more preferably 0.5 to 8 parts by weight. If the compounding amount is too small, the effect of suppression of migration is not sufficient, while conversely if too large, the rolling resistance deteriorates, and therefore, these are not preferred.

The melamine derivative having the formula (IV) and/or polymer or copolymer resins thereof are preferably compounded, at the second step after mixing the diene-based rubber, silica, sulfur-containing silane coupling agent, and compound having the formula (II) or the salts thereof and/or the formula (III) or later, from the viewpoint of suppression of inhibition of silanization.

The rubber composition according to the present invention may contain, in addition to the above ingredients, carbon black or other fillers, a vulcanization or cross-linking agent, a vulcanization or cross-linking accelerator, various types of oils, an antioxidant, a plasticizer, or various other types of additives generally compounded in tire or other rubber compositions. These additives are kneaded by a general method to obtain a composition which can be used for vulcanization or cross-linking. The compounding amounts of these additives can be made the conventional general compounding amounts insofar as the object of the present invention is not contravened.

EXAMPLES

Examples will now be used to further explain the present invention, but the scope of the present invention is by no means limited to these Examples.

Standard Example I-1 and Examples I-1 to I-8

Preparation of Samples

The ingredients other than the vulcanization accelerator and sulfur in each of the formulations shown in Table I-1 were mixed in a 1.5-liter internal mixer for 9 minutes. After reaching 150° C., the resultant mixture was discharged to obtain a master batch. The vulcanization accelerator and sulfur were mixed into this master batch by an open roll to obtain a rubber composition. This rubber composition was used to evaluate the unvulcanized properties by the test methods shown below. The results are shown in Table I-1.

The amounts of the ingredients other than the ingredients shown in Table I-1 are shown below.

SBR: VSL-5025 HM-1 made by LANXCESS (oil extended) (103.1 parts by weight, rubber content 75 parts by weight)

BR: Nippol BR 1220 made by Nippon Zeon (25 parts by weight)

Silica: Zeosil 1165MP made by Rhodia (80 parts by weight)

Silane coupling agent: Si69 made by Degussa (6.4 parts by weight)

Oil: Diana Process AH-24 made by Idemitsu Kosan (4.32 parts by weight)

ZnO: Zinc Oxide Type 3 made by Seido Chemical Industry (2.5 parts by weight)

Stearic acid: Beads Stearic Acid YR made by NOF Corporation (2.5 parts by weight)

Sulfur: Oil-treated sulfur made by Hosoi Chemical Industry (1.4 parts by weight, sulfur content 1.1 parts by weight)

Vulcanization accelerator: CBS Noccelar CZ-G made by Ouchi Shinko Chemical Industrial (1.7 parts by weight)

Next, the rubber composition thus obtained was vulcanized in a 15×15×0.2 cm mold at 160° C. for 30 minutes to prepare a vulcanized rubber sheet, which was then measured by the test methods shown below to determine the physical properties of the vulcanized rubber. The results are shown in Table I-1.

Test Methods for Evaluation of Rubber Physical Properties

The following methods were used for evaluation. The results are all shown indexed to Standard Example I-1 as 100. The larger the value, the better the result shown.

T95: Measured by ODR at the determination temperature of 160° C. (based on ASTM-D2084).

Dispersability: RPA2000 made by α Technology Company was used to measure strain shear stress G' using unvulcanized rubber. The G' at a strain of 0.28% to 100.0% was measured and the difference (G' 0.28% (MPa)–G' 100.0% (MPa)) was found.

Reinforcibility: M300/M100 was used as evaluation of reinforcibility (based on JIS-K6251).

Rolling resistance: A viscoelastic spectrometer made by Toyo Seiki Seisakusho was used to measure the loss tangent (tan δ) at 60° C. under conditions of an initial strain of 10%, amplitude of ±2%, and frequency of 20 Hz.

TABLE I-1

|  | Standard Example I-1 | Example I-1 | Example I-2 | Example I-3 | Example I-4 | Example I-5 | Example I-6 | Example I-7 | Example I-8 |
|---|---|---|---|---|---|---|---|---|---|
| Formulation (parts by weight) | | | | | | | | | |
| DBN*[1] | — | 1.0 | 2.0 | — | — | 1.0 | 2.0 | 2.0 | — |
| DBN octylate*[2] | — | — | — | 1.0 | 2.0 | 1.0 | 2.0 | — | 2.0 |
| DPG*[3] | 2.0 | 1.0 | — | 1.0 | — | — | — | — | — |
| Charging method*[4] | 1st stage | 1st stage | 1st stage | 1st stage | 1st stage | 1st stage | 1st stage | 2nd stage | 2nd stage |
| Results of evaluation | | | | | | | | | |
| T95 | 100 | 104 | 108 | 102 | 104 | 103 | 106 | 109 | 106 |
| Dispersability | 100 | 115 | 120 | 113 | 117 | 114 | 118 | 106 | 105 |
| Reinforcability (M300/M100) | 100 | 115 | 120 | 112 | 117 | 113 | 118 | 107 | 111 |
| Rolling resistance | 100 | 105 | 107 | 103 | 105 | 104 | 106 | 102 | 102 |

Table I-1 notes
*[1]DBN: DBN made by San-Apro
*[2]DBN octylate: U-CAT1102 made by San-Apro
*[3]DPG: PERKACIT DPG made by Flexys
*[4]Charge timings of Notes *1 to *3 shown. "First stage" is mixing step for mixing compounding agents other than vulcanizer (i.e., sulfur and vulcanization accelerator), while the second stage means the charging of the compounding agents of *1 to *3 at the step of mixing the vulcanizer.

Standard Examples II-1 to II-5 and Examples II-1 to II-42

Preparation of Samples

In each of the formulations shown in Tables II-1 to II-5, the ingredients other than the vulcanization accelerator and sulfur were mixed in a 1.5 liter internal mixer for 6 minutes. When reaching 150° C., the resultant mixture was discharged to obtain a master batch. To this master batch, the vulcanization accelerator and sulfur were mixed by an open roll to obtain a rubber composition.

Next, the rubber composition thus obtained was vulcanized in a 15×15×0.2 cm mold at 160° C. for 20 minutes to prepare a vulcanized rubber sheet, which was then determined for tan δ (60° C.). The results are shown indexed to the values of Standard Example as 100 and shown in Tables II-1 to II-5.

Test Methods for Evaluation of Physical Properties of Rubber

Payne effect: Unvulcanized rubber composition used based on ASTM P6204 to measure G' (0.56%) at RPA2000.

All numerical values are shown indexed. The larger the value, the smaller the Payne effect.

Tan δ (60° C.): Determined as an intermediate physical quantity of the rolling resistance using a viscoelastic spectrometer made by Toyo Seiki under conditions of a frequency of 20 Hz, an initial strain of 10%, a dynamic strain of 12% and a temperature of 60° C. All numerical values are shown indexed. The larger the value, the better the rolling resistance.

Cord/rubber pullout force after aging: Brass-plated steel cords (1×5 structure) were embedded in a 2 mm thick belt cord rubber composition at 12.5 mm intervals to become mutually parallel. Further, the outsides were sandwiched by a rubber composition containing an amine compound and vulcanized at 170° C.×10 minutes to obtain a sample. The sample was immersed in 80° C. warm water for 4 weeks, then the rubber pullout force was evaluated based on ASTM D2229. All numerical values are shown indexed. The larger the value, the better the results.

TABLE II-1

|  | Standard Example | Example | | | | | | | |
|---|---|---|---|---|---|---|---|---|---|
|  | II-1 | II-1 | II-2 | II-3 | II-4 | II-5 | II-6 | II-7 | II-8 |
| 3-Quinuclidinol*[3] | 2 | 2 | 2 | 2 | 2 | 1 | 2.5 | 2 | 5 |
| HMMM*[2] | 0 | 2 | 4 | 8 | 12 | 2 | 5 | 4 | 2 |
| HMMM charging stage | — | 2 | 2 | 2 | 2 | 2 | 2 | 1 | 2 |
| Payne effect | 100 | 111 | 109 | 108 | 107 | 108 | 110 | 103 | 116 |
| tan δ (60° C.) | 100 | 106 | 105 | 104 | 101 | 104 | 105 | 101 | 110 |
| Cord/rubber pullout force after aging | 100 | 109 | 115 | 117 | 118 | 114 | 116 | 110 | 102 |

TABLE II-2

|  | Standard Example | Example | | | | | | | |
|---|---|---|---|---|---|---|---|---|---|
|  | II-2 | II-9 | II-10 | II-11 | II-12 | II-13 | II-14 | II-15 | II-16 |
| 3-Quinuclidinol*[3] | 2 | 2 | 2 | 2 | 2 | 1 | 2.5 | 2 | 5 |
| HMMM*[2] | 0 | 2 | 4 | 8 | 12 | 2.3 | 5.7 | 4 | 2 |
| HMMM charging stage | — | 2 | 2 | 2 | 2 | 2 | 2 | 1 | 2 |

TABLE II-2-continued

|  | Standard Example | Example | | | | | | | |
|---|---|---|---|---|---|---|---|---|---|
|  | II-2 | II-9 | II-10 | II-11 | II-12 | II-13 | II-14 | II-15 | II-16 |
| Payne effect | 100 | 109 | 107 | 106 | 106 | 106 | 108 | 103 | 114 |
| tan δ (60° C.) | 100 | 105 | 103 | 103 | 101 | 103 | 104 | 101 | 107 |
| Cord/rubber pullout force after aging | 100 | 110 | 115 | 117 | 121 | 115 | 117 | 111 | 103 |

TABLE II-3

|  | Standard Example | Example | | | | | | | |
|---|---|---|---|---|---|---|---|---|---|
|  | II-3 | II-17 | II-18 | II-19 | II-20 | II-21 | II-22 | II-23 | II-24 |
| DABCO[*4] | 2 | 2 | 2 | 2 | 2 | 1 | 2.5 | 2 | 5 |
| HMMM[*2] | 0 | 2 | 4 | 8 | 12 | 2.3 | 5.7 | 4 | 2 |
| HMMM charging stage | — | 2 | 2 | 2 | 2 | 2 | 2 | 1 | 2 |
| Payne effect | 100 | 108 | 106 | 105 | 105 | 105 | 107 | 102 | 110 |
| tan δ (60° C.) | 100 | 104 | 102 | 102 | 100 | 102 | 103 | 101 | 105 |
| Cord/rubber pullout force after aging | 100 | 109 | 114 | 116 | 118 | 114 | 116 | 109 | 104 |

TABLE II-4

|  | Standard Example | Examples | | | | | | | | |
|---|---|---|---|---|---|---|---|---|---|---|
|  | II-4 | II-25 | II-26 | II-27 | II-28 | II-29 | II-30 | II-31 | II-32 | II-33 |
| DBU[*5] | 2 | 2 | 2 | 2 | 2 | 1 | 2.5 | 2 | 1 | 5 |
| Quinuclidine[*1] | — | — | — | — | — | — | — | — | 1 | — |
| HMMM[*2] | 0 | 2 | 4 | 8 | 12 | 2.7 | 6.8 | 4 | 2 | 2 |
| HMMM charging stage | — | 2 | 2 | 2 | 2 | 2 | 2 | 1 | 2 | 2 |
| Payne effect | 100 | 113 | 112 | 110 | 107 | 111 | 112 | 107 | 111 | 115 |
| tan δ (60° C.) | 100 | 106 | 105 | 104 | 102 | 104 | 105 | 103 | 105 | 108 |
| Cord/rubber pullout force after aging | 100 | 108 | 113 | 115 | 123 | 113 | 115 | 110 | 109 | 103 |

TABLE II-5

|  | Standard Example | Example | | | | | | | | |
|---|---|---|---|---|---|---|---|---|---|---|
|  | II-5 | II-34 | II-35 | II-36 | II-37 | II-38 | II-39 | II-40 | II-41 | II-42 |
| DBN[*6] | 2 | 2 | 2 | 2 | 2 | 1 | 2.5 | 2 | 1 | 5 |
| DABCO[*4] | — | — | — | — | — | — | — | — | 1 | — |
| HMMM[*2] | 0 | 2 | 4 | 8 | 12 | 2.2 | 5.6 | 4 | 2 | 1 |
| HMMM charging stage" | — | 2 | 2 | 2 | 2 | 2 | 2 | 1 | 2 | 2 |
| Payne effect | 100 | 115 | 113 | 112 | 108 | 112 | 114 | 109 | 113 | 116 |
| tan δ (60° C.) | 100 | 107 | 106 | 104 | 102 | 104 | 105 | 103 | 106 | 110 |
| Cord/rubber pullout force after aging | 100 | 109 | 114 | 116 | 120 | 114 | 116 | 114 | 108 | 103 |

Table II-1 to II-5 Notes
[*1]Quinuclidine made by Aldrich
[*2]Cyrez964 BPF made by Cytec Industries Inc.
[*3]3-Quinuclidinol made by Aldrich
[*4]DABCO made by Aldrich
[*5]DBU made by San-Apro
[*6]DBN made by San-Apro The formulation other than the ingredients shown in Tables II-1 to II-5 was as follows:

SBR: VSL-5025 HM-1 (oil extended) made by LANXCESS (103.1 parts by weight, rubber content 75 parts by weight)

BR: Nippol BR 1220 made by Nippon Zeon (25 parts by weight)

Silica: Zeosil 1165 MP made by Rhodia (80 parts by weight)

Silane coupling agent: Si69 made by Degussa (6.4 parts by weight)

Oil: Diana Process AH-24 made by Idemitsu Kosan (10 parts by weight)

ZnO: Zinc Oxide Type 3 made by Seido Chemical Industry (2.5 parts by weight)

Stearic acid: Beads Stearic Acid YR made by NOF Corporation (2.5 parts by weight)

Sulfur: Oil-treated sulfur made by Hosoi Chemical Industry (1.4 parts by weight, sulfur content 1.33 parts by weight)

Vulcanization accelerator: CBS Noccelar CZ-G made by Ouchi Shinko Chemical Industrial (1.7 parts by weight)

INDUSTRIAL APPLICABILITY

According to the present invention, by compounding a silica-containing rubber composition a DBN having the formula (I) having a piperidine skeleton and/or the salts thereof, it is possible to improve the vulcanization speed of the rubber composition, the dispersion of the silica, the reinforcibility and the viscoelastic properties and to decrease the amount of DPG, and therefore, this is useful as a rubber composition for a pneumatic tire.

According to the present invention, further, by compounding into a silica-containing rubber composition, a compound having a piperidine skeleton of the formula (II) or the salts thereof, or formula (III), it is possible to improve the vulcanization speed of the rubber composition, the dispersion of the silica, the reinforcibility and the viscoelastic properties and to decrease the amount of DPG, and therefore, this is useful as a rubber composition for a pneumatic tire and by compounding in a melamine derivative of formula (IV) or polymer or copolymer resins of the same, the migration of the compound to adjacent parts is suppressed and the problem of the decrease in rubber/metal bondability is solved, and therefore, this is useful as a rubber composition for parts of a pneumatic tire, for example, a cap tread or under tread.

The invention claimed is:

1. A rubber composition comprising 100 parts by weight of a diene-based rubber, 20 to 120 parts by weight of silica, 3 to 15% by weight of a sulfur-containing silane coupling agent, based upon the weight of the silica, 0.1 to 10 parts by weight of a compound having a piperidine skeleton of the formula (II) or a salt thereof and/or formula (III):

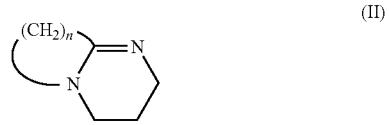

wherein n indicates 3 or 5

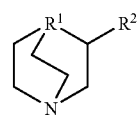

wherein $R^1$ indicates CH or N; and $R^2$ indicates H or OH when $R^1$ is CH, or indicates H when $R^1$ is N, and 0.2 to 10 parts by weight of a melamine derivative having the formula (IV):

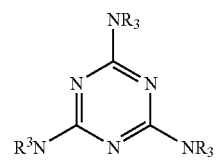

wherein $R^3$ is a methoxymethyl group ($-CH_2OCH_3$) or a methylol group ($-CH_2OH$), the number of methoxymethyl groups is 3 to 6 and the number of methylol groups is 0 to 3 and/or polymer or copolymer resins thereof.

2. A rubber composition as claimed in claim 1, wherein the compounding amount of the melamine derivative and/or polymer or copolymer resin thereof is 0.2 to 10 parts by weight based upon 100 parts by weight of the diene-based rubber.

3. A rubber composition as claimed in claim 1, wherein the melamine derivative is methylol melamine.

4. A rubber composition as claimed in claim 1, wherein a melamine derivative having the formula (IV) and/or polymer or copolymer resins thereof is produced by mixing, at a second step after mixing, the diene-based rubber, silica, sulfur-containing silane coupling agent and a compound having the formula (II) or a salt and/or formula (III).

5. A pneumatic tire using a rubber composition according to claim 1 as a tire tread.

6. A pneumatic tire as claimed in claim 5, wherein the tire tread is a tire cap tread.

* * * * *